March 28, 1950 — J. G. TRUMP — 2,501,881
APPARATUS FOR REDUCING DESTRUCTIVE TRANSIENTS
IN ELECTROSTATIC BELT GENERATORS Filed Jan. 21, 1948 — 6 Sheets-Sheet 1

Inventor:
John G. Trump
by Emery, Booth, Townsend, Weld and Heather
Attys.

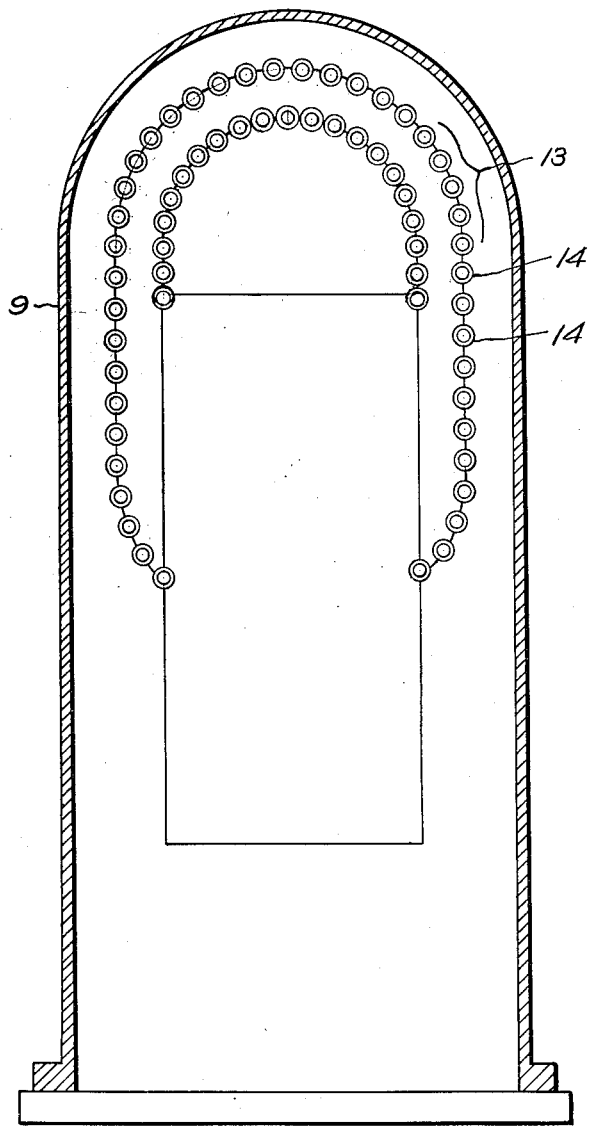

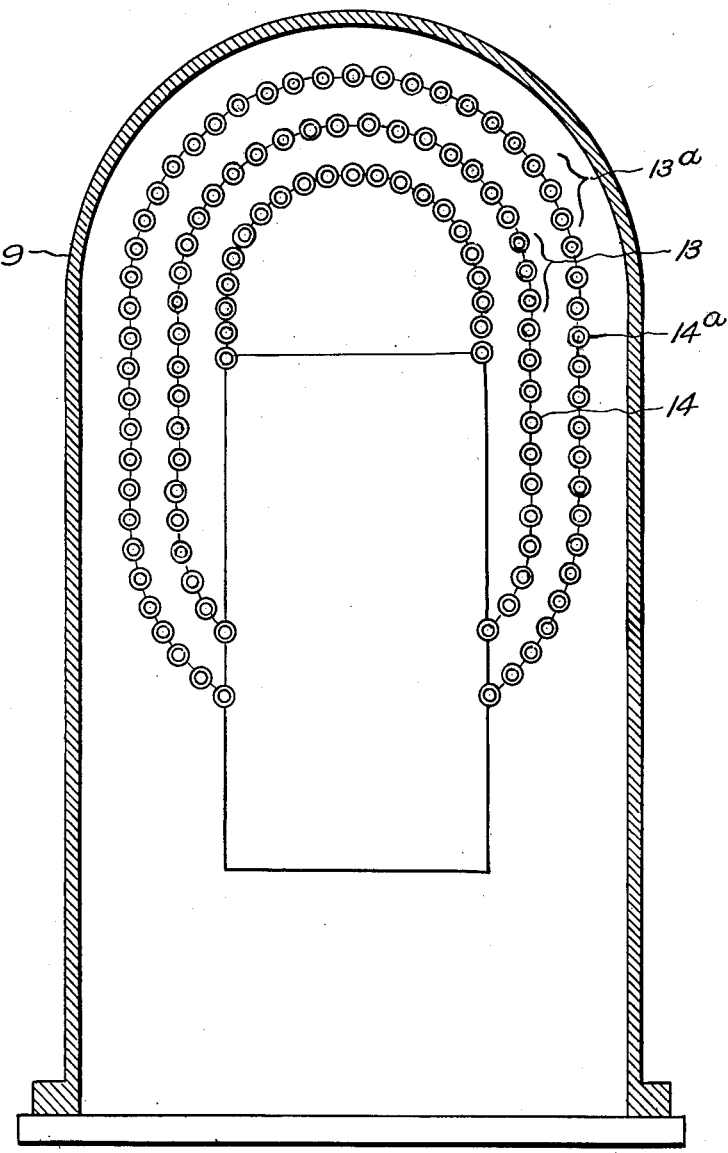
Fig. 3^A

March 28, 1950     J. G. TRUMP     2,501,881
APPARATUS FOR REDUCING DESTRUCTIVE TRANSIENTS
IN ELECTROSTATIC BELT GENERATORS
Filed Jan. 21, 1948     6 Sheets-Sheet 4

Inventor:
John G. Trump.

March 28, 1950     J. G. TRUMP     2,501,881
APPARATUS FOR REDUCING DESTRUCTIVE TRANSIENTS
IN ELECTROSTATIC BELT GENERATORS
Filed Jan. 21, 1948     6 Sheets-Sheet 5

Inventor
John G. Trump.
Attys

March 28, 1950     J. G. TRUMP     2,501,881
APPARATUS FOR REDUCING DESTRUCTIVE TRANSIENTS
IN ELECTROSTATIC BELT GENERATORS
Filed Jan. 21, 1948     6 Sheets—Sheet 6

Inventor:
John G. Trump

Patented Mar. 28, 1950

2,501,881

UNITED STATES PATENT OFFICE 2,501,881

APPARATUS FOR REDUCING DESTRUCTIVE TRANSIENTS IN ELECTROSTATIC BELT GENERATORS

John G. Trump, Winchester, Mass., assignor to Research Corporation, New York, N. Y., a corporation of New York Application January 21, 1948, Serial No. 3,418

35 Claims. (Cl. 171—329)

This invention relates to apparatus for reducing destructive transients in electrostatic belt generators.

In order that the principle of the invention may be readily understood, there are herein disclosed several selected embodiments of the apparatus of the invention, by means of which the invention may be practised.

Electrostatic belt generators of what may be termed the "Van de Graaff" type consist essentially of a well rounded terminal insulated from ground for high voltages to which electric charge is conveyed by means of a rapidly moving belt of insulating material. Such type of apparatus is shown in the patent to Robert J. Van de Graaff, No. 2,230,473, February 4, 1941, and in the patent to John C. Trump, No. 2,252,668, August 12, 1941.

Such apparatus when utilized as generators is intended for the production of high, steady, direct-current potentials and comprises generally an electrode mounted on an insulating support to which charges are constantly transferred by a charge conveying medium, usually in the form of a movable carrier body, and more often in the form of an endless rapidly-moving belt of insulating material such as shown in said patents. The said terminal is of a well rounded form such as indicated at 11 in said patents. The supporting column for the said high voltage terminal as constructed prior to the present invention is conveniently built of spaced conducting members separated by insulating disks within which the said electrically charged belt or carrier is arranged to pass, and within which supporting column the acceleration tube or other generator load is arranged.

Such electrostatic belt generators are at present insulated in compressed gas at elevated pressures and have thereby attained a great compactness for even high voltage ratings. For example, a two-million volt constant-potential electrostatic belt generator has been constructed which is housed in a pressure tank thirty inches in diameter and fifty-four inches high on the inside and filled with nitrogen at twenty-seven atmospheres pressure. Physically larger generators have also been built in the same voltage range, and at the present time new electrostatic belt generators are under development which will operate up to ten to fifteen million volts, and which will be contained in tanks that are from ten to fifteen feet in diameter and are thirty to fifty feet high, containing compressed gases at pressures between ten and fifty atmospheres.

The voltage attained by these electrostatic belt generators depends primarily upon the ability of the high voltage terminal, such as indicated at 11 in said patents, to insulate this voltage. The potential of the terminal rises as more and more charge is brought to it by the said rapidly traveling belt of insulating material, until either it is limited by sparkover or by the removal of charge from such terminal through corona or along the useful load, or by sparkover of the terminal to ground. Such sparkover may take place between the terminal and the surrounding tank, lengthwise the supporting column between the metallic members thereof, along the electrically-charged rapidly-traveling conveyor belt, or along the acceleration tube of the generator. In general, the electrostatic generator may be operated at any voltage up to such values at which sparkover will occur.

The problem to the solution of which the present invention is directed, is concerned with the destructive effects of such sparkover. For generators of high voltage rating, the destructive effect of such sparkover may be serious. The stored energy, which is released in a flashover from the high voltage terminal to the tank of the generator, is equal to $CE^2/2$, where C is the capacitance of the terminal to ground, and where E is the terminal voltage. If the generator makes use of one or more equipotential shields around the terminal, such as disclosed and claimed in the said patent to Robert J. Van de Graaff No. 2,230,473, the stored energy of such shields is likewise large because of their relatively large area and intermediate voltage, and the effect of a discharge may be destructive. The most serious destructive effect results from flashover between the terminal and ground along the carrier belt of insulating material. Such discharges may rend the material and cause its mechanical failure, or such discharges may cause or produce carbonized tracks along the belt and thus entirely destroy its insulating properties. For very large stored energies, the possible roughening of the metallic electrode surfaces is a matter of very considerable concern, since such surface roughness enhances the possibility of corona, and thus limits the terminal voltage. Destruction by flashover of the solid insulator column supports and of the acceleration tube wall may also result.

It is highly desirable, therefore, with such larger generators to reduce, and the invention herein disclosed does reduce, the effect of sparkover (a) by reducing the capacitance which can discharge in a given interval of time, and (b) by introducing impedances so as to spread out the discharge over a longer period of time, and thereby to reduce the peak value of the discharge current. The introduction of such impedance, in accordance with this invention, has also the effect of inhibiting an incipient discharge so that sparkover which would develop in a low impedance circuit is often prevented.

As disclosed in the accompanying drawings, to which specific reference will hereinafter be made, the results referred to are accomplished in a number of different ways, certain of which will be illustrated and specifically described as the selected embodiments of apparatus by which the invention may be practised, but to which the invention is not limited. The broad principle involved is that the surface of the high-voltage terminal is such that there exists a high impedance to the flow of charge from one region of the surface to another. This can be accomplished in different ways, and herein it is accomplished by (a) forming the surface of wound rods or rings, or (b) slotting or dividing the surface forming the high-voltage terminal, or (c) using high-resistance material in place of metal.

By the first of the disclosed embodiments the high-voltage terminal or the equipotential shield or shields around it, or both the terminal and the shield or shields, are built of a number of closely-spaced hollow or solid rings which are physically attached together so as to form an electrode which may be of the conventional dome-shape, such as shown at 11 in said patents. The connections for the said closely spaced rings are arranged to have high resistance or inductance or both. The effect of the spacing between the said ring-like elements is to divide the total surface into many surfaces which are individually of small area. The effect of such special connections is to provide a high impedance between adjacent electrically charged surfaces. Thus a discharge which develops from one of the component surface elements would be of limited energy because of its relatively small capacitance and, in the event of its discharge, there would be considerable delay in the flow of charge from the other elements attached to it because of the high resistance or inductance of the connecting paths. The said connections or connectors, to which reference has above been made, may be very simple; for example, even if the spaced elements are connected merely by short metallic studs, the inductance of such connecting paths will result in a high impedance to a current transient because of their exceedingly steep wave fronts.

The second of the herein disclosed ways involves, as stated, the principle of dividing the large electrically charged surface, such as is constituted by the dome-shaped terminal or by the shield or shields about it, into a plurality of small surfaces connected to each other by paths of high transient impedance. For example, and as hereinafter more fully disclosed, there is employed the conventional metallic sheet construction of the dome or shield or shields, such as shown in the said patents, and then slots are formed throughout in such metallic sheet, as hereinafter more fully referred to, so as to cause surface currents to take a devious route in order to reach the discharge point. In accordance with this embodiment of the apparatus of the invention, the cylindrical portion of such electrodes may be built by winding a rod into a close-spaced single-layer helix. From ordinary considerations, the envelope of such a helix would be of the same potential for steady-state conditions, but a high potential difference between turns of such helix would develop in the event of a discharge because of inductance of such construction.

In accordance with the third of the disclosed embodiments of the invention, the surface of the high voltage terminal (or of the shield or shields) is formed of high-resistance material in place of metal. The material employed for this purpose must be capable of withstanding the effects of sparkover and the transient flow of current when it occurs. In principle the use of high-resistance material is equivalent to the introduction of impedances between one section of the terminal and another.

Similar means for and a similar method of delaying the development of transients along the supporting column of such generators (and by "supporting column" is meant the entire supporting column, such for example as that shown in the said patent to John G. Trump, No. 2,252,668, and a portion of which is illustrated in detail in vertical section in Fig. 4 of said patent) can be provided by dividing such or a like supporting column into sections, and connecting the individual sections thereof together through a high impedance. The number of such sections connected through high impedance depends upon the height of the column. For example, if the height of the column be ten feet, the number of sections so connected may be but need not necessarily be about ten, and for other lengths of columns the number of sections might correspond accordingly. The invention is not limited to any particular number of sections into which the supporting column is so divided, and which sections are connected together through high impedances.

As hereinafter more fully disclosed, the adjacent ends of each two next adjacent sections are spaced one from another and are insulated for a high voltage. Substantially no voltage difference exists between such two adjacent ends, however, under normal steady-state operation, since they are electrically connected together by a conductive connection. Such connection, as hereinafter more fully disclosed, may be in the form of one or more turns of wire, or any other suitable construction or shape of connection may be provided which will offer high impedance to the high-frequency components of a transient current. As a result, if a transient disturbance attempts to propagate from one section into the next adjacent section, it encounters the described high impedance barrier, which both reduces the magnitude of the disturbance that is propagated and delays the propagation of this disturbance into the next adjacent section.

In order to secure this effect, it is preferable that the capacitance between the two next adjacent ends of the said sections be well insulated from one another except for such connection, and that the inductive connection have a minimum of mutual capacitance. Desirably, also, this connection has considerable ohmic resistance. This hardly interferes with steady-state operation of electrostatic generators even for ohmic values as high as $10^8$ ohms, but would have a pronounced damping action on any oscillations which develop in the transient inhibiting network thus introduced.

The long supporting columns of large pressure-insulated electrostatic generators are, in accordance with the invention, divided into a suitable plurality of such sections with such transient inhibiting networks introduced between each.

In the accompanying drawings, wherein are disclosed several embodiments of apparatus by which this invention may be practised—

Fig. 3 is a vertical section similar to Fig. 1, but showing a shield between the main high-potential electrode or terminal and the tank, the charge-carrying belt and the details of the supporting column being omitted;

Fig. 3A is a vertical section similar to Fig. 3, but showing two concentric shields between the main high-potential electrode or terminal and the tank;

Figure 1:
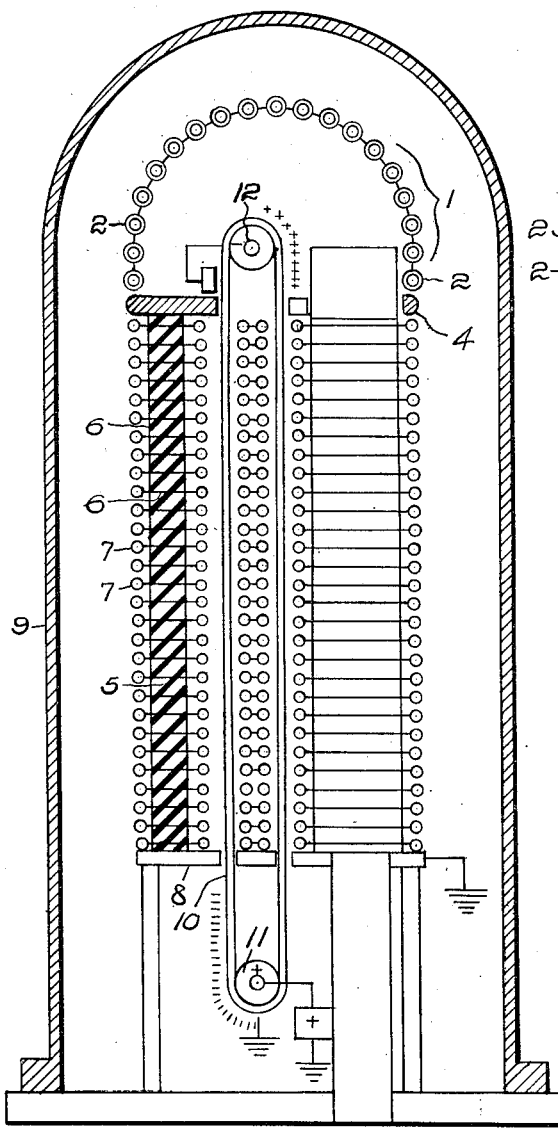
Fig. 1 is a view, mainly in vertical transverse section, showing one type of high-voltage electrostatic generator employing a charge-carrying belt, and representing the first referred to embodiment of the invention.
Figure 6:
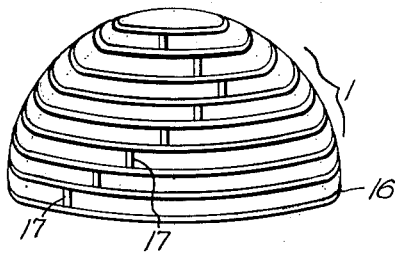
Figure 7:
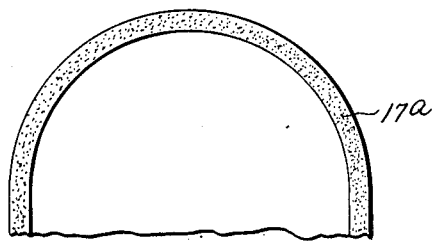
Figure 8:
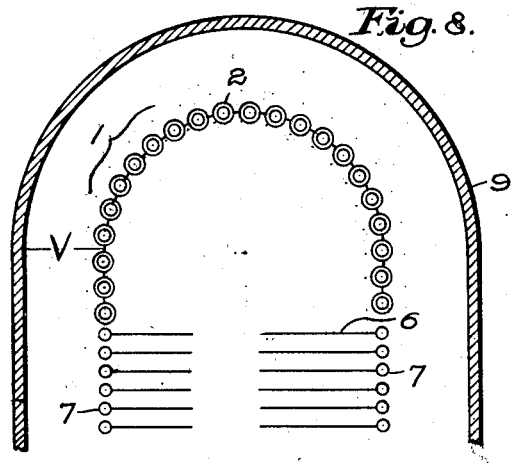
Figure 9:
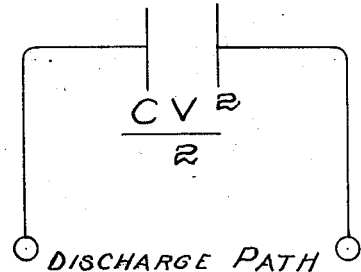
Figure 10:
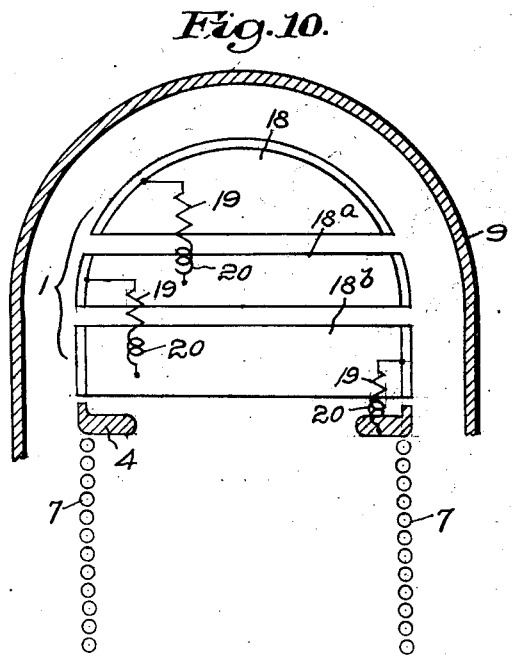
Figure 11:
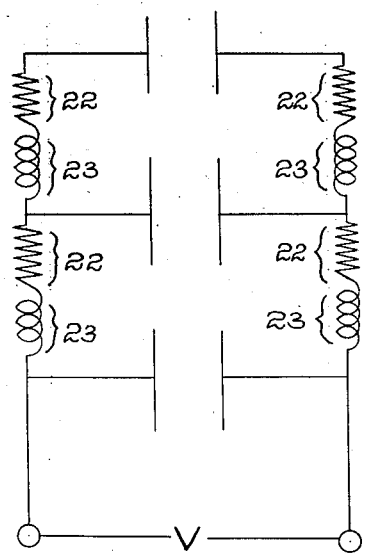
Figure 12:
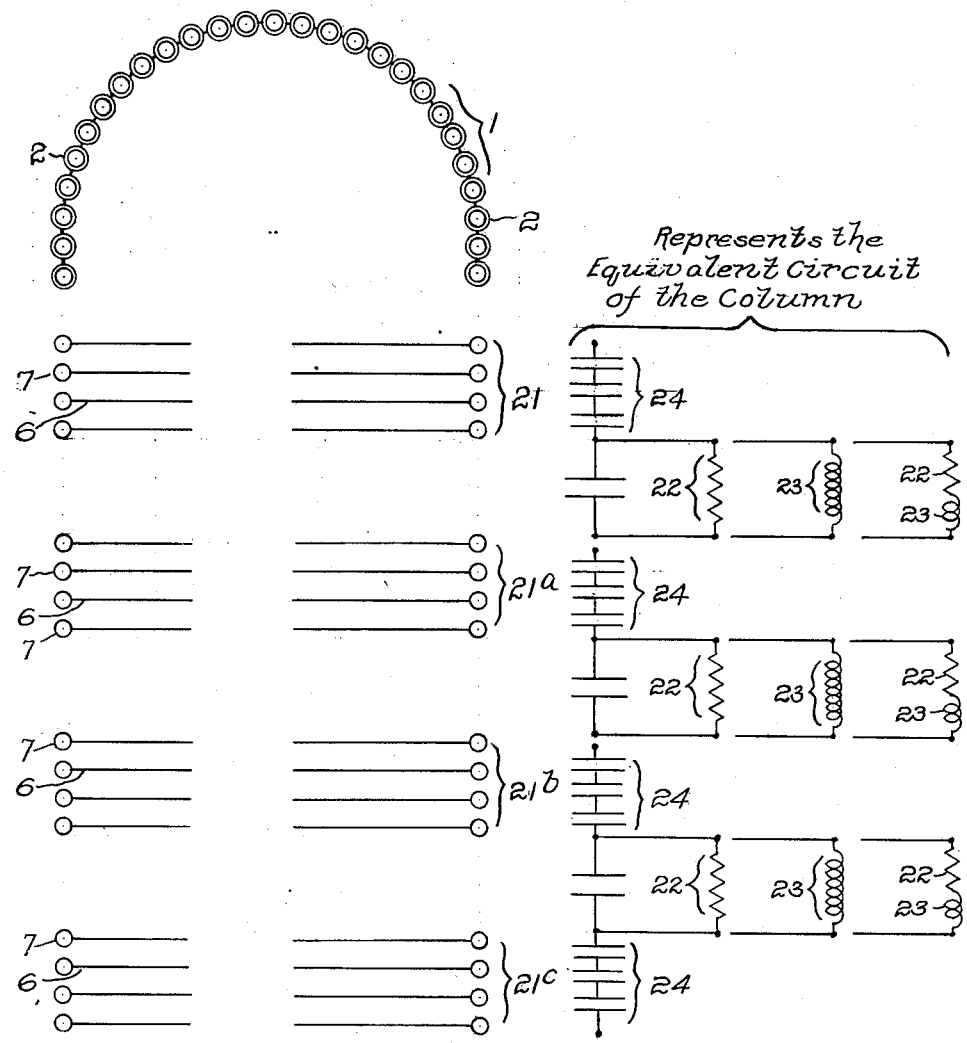

Fig. 6 is a side elevation of still another form or embodiment of the main high-potential electrode or terminal constructed in accordance with the invention, and constituting a variation of the said first embodiment, but from which, to avoid confusion of lines, there have been omitted the illustration of the portions of the rod of which the dome-shape electrode or terminal is composed, that are at the rear thereof from the observer;

Fig. 7 is a view in vertical transverse section of a high-voltage terminal formed of high-resistance material in place of metal;

Fig. 8 is a view in vertical transverse section similar to the upper portion of Fig. 1, but indicating also a portion of the supporting column of the generator, which column is divided into sections to be connected together through a high-impedance;

Fig. 9 is a diagrammatic indication of the electrostatic action in the event of a discharge of stored energy;

Fig. 10 is a vertical section that may be similar to the upper portion of Fig. 1, but representing sections or portions of the main high-potential electrode or terminal of any suitable construction connected by resistances and impedances;

Fig. 11 is a diagrammatic representation of a construction of the main high-potential electrode or terminal or of supporting column employing both resistances and impedances; and Fig. 12 is a view partly in vertical transverse section and partly diagrammatic, to show the main high-potential electrode or terminal as in Fig. 1, and showing the supporting column divided into sections, the adjacent sections thereof being connected together through a resistance or an impedance, or through both a resistance and an impedance.

Referring to the drawings, and first to Fig. 1, therein is shown such parts of an electrostatic generator as are necessary to an understanding of this invention. The said generator is of the type shown in the patent to John G. Trump, No. 2,252,668, August 12, 1941. The invention herein claimed may be applied to the said type of electrostatic generator apparatus, but the invention is not necessarily limited to use with such type of generator apparatus.

Figure 2:
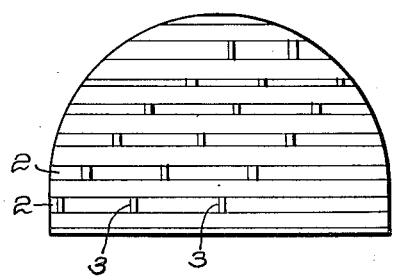
Fig. 2 is a side elevation of the main high-potential electrode or terminal of the hemispherical or dome-shape shown in Fig. 1, the remainder of the apparatus shown in Fig. 1 being omitted.

In Fig. 1 the said electrostatic generator comprises the main high-potential electrode or terminal 1 consisting of a substantially hemispherical or dome-shaped structure built of a number of closely spaced rings 2, 2 of conducting material, such as brass, and which are physically attached together as indicated at 3, 3 in Fig. 2 to form an electrode or terminal which may be otherwise of conventional shape. The number of such closely spaced rings, which may be hollow or solid, depends of course upon the dimensions of the said dome-shaped electrode or terminal. The said connections 3 between all of the conducting rings 2 have high resistance or inductive impedance to transient currents or both. The effect of the spacing between the ring-like elements 2, 2 is to divide the total surface into many surfaces of individually small area, and the effect of the special connections 3 is to provide a high impedance between adjacent electrically charged surfaces together constituting the electrode or terminal 1.

I have indicated the high impedance connections 3 in Fig. 1, and in the like Figs. 3, 8, 10 and 12, it being understood that they are present, as shown in Fig. 2, but they may be irregularly arranged.

The electrode or terminal 1 rests upon a ring 4 of conductive metal, the outer exposed surface of which is rounded, the said ring 4, in turn, being mounted upon the top of the supporting column which, excepting for the division thereof into a plurality of sections connected together through a high impedance, may be of the general structure shown in the said patent to John G. Trump, No. 2,252,668, and particularly in Fig. 4 thereof, and includes as a part of the said supporting column any suitable number of spaced elongated pillars, such as three, one of which is shown at 5. The said pillars 5 may be similar to those shown in the said patent to John G. Trump, and they are built of layers of insulating material of high dielectric strength, the entire supporting column including a series of horizontal plates 6, 6 extending between separated rings 7, 7, each of conductive metal, and preferably tubular in form to present rounded external surfaces, these rings being connected with each other by suitable resistances so as to divide the potential on the terminal uniformly between them, as described in the said patent to John G. Trump, No. 2,252,668. The said series of plates 6 extend between the rings 7 and the corresponding conducting tubes on the ascending side of the charge-carrier.

The bases of the pillars 5 rest on the base plate 8 of conductive material which is supported by suitable brackets attached to the inner walls of a tank 9, which provides a chamber completely enclosing all the parts of the generating apparatus, but leaving a substantial clearance between its walls and the electrode or terminal and supporting column. The said tank 9 is filled with a gas of many atmospheres pressure which, for air, may be about four hundred pounds per square inch, or it may be filled with nitrogen or other compressed gas at pressures between ten and fifty atmospheres according to the size of the generator.

The charge-carrier may be of any suitable type, but it is herein shown as in the form of an endless belt 10 of such construction that the charges on its surface are longitudinally insulated from each other, the belt herein being of insulating material, such as a multiple-ply rubber fabric. At its lower end the belt 10 passes over a metallic driving pulley 11 journaled in suitable brackets on the base plate, so that the said pulley 11 has a ground connection, as indicated. The said pulley 11 is driven by a suitable motor, not herein illustrated, to which current is applied by conductors entering the walls of the tank 9 through a suitable bushing.

The said belt 10 runs vertically upward and then downward in a parallel line, passing into and out of the hollow electrode or terminal 1, composed, in the embodiment of the invention shown in Figs. 1 and 2, of connected closely-spaced rings of conducting material, the said belt 10 passing in its course over a metallic pulley 12 within the said electrode or terminal 1, the said pulley 12 being journaled in or insulated from suitable brackets supported by the ring 4 in a manner not necessary to illustrate or to refer to further.

At the lower end of the run of the belt 10 charges of one sign are established on the said moving belt and at the upper end thereof the charges carried thereby are removed and transferred to the electrode or terminal 1 consisting, as shown in Figs. 1 and 2, of the said close spaced but connected conductive rings 2. Simultaneously, charges of the opposite sign are transferred through the said electrode or terminal 1 to the said belt 10 at the upper end of its run and are carried away by the depending run thereof to the lower end of the said belt, where they are removed.

As herein stated, the effect of the connected conductive rings 2 constituting the electrode or terminal 1 is to divide the total surface of such electrode or terminal into many surfaces of individually small area, and the effect of the connections 3 between the respective rings 2 is to provide a high impedance between the adjacent electrically charged surfaces that together constitute the electrode or terminal 1. Thus a discharge which developed from one of the component surface elements or rings 2 would be of limited energy because of its relatively small capacitance, and, in the event of its discharge, there would be considerable delay in the flow of charge from the other elements or rings 2 attached to it, because of the high resistance or inductance of the connecting paths 3 between the said rings 2. The connectors between the rings 2, indicated merely diagrammatically at 3, may be quite simple in structure, and in certain instances they consist merely of short metallic studs, since the inductance provided by the connecting paths constituted by such metallic studs, results in a high impedance to a current transient because of their exceedingly steep wave fronts.

In Fig. 1 no shield is shown between the electrode or terminal 1 and the surrounding tank 9. I may employ one or more concentric shields between the electrode or terminal 1 and the tank 9, and in Fig. 3 I have represented a single shield indicated generally at 13, which is constructed in such way as to divide the total surface thereof into many surfaces of individually small areas. This may be done by constructing the said shield 13 of a suitable number of closely-spaced conducting connected rings 14 similar to the rings 2 of which the electrode or terminal 1 is composed, which rings 14 are connected by connectors such as 3 in Fig. 2, or by any other suitable connections constituting high resistance or inductive impedance or both. Or the said shield, or a plurality of shields if more than one is employed, may be constructed in any way in which the electrode or terminal 1 is constructed in accordance with my invention, and certain examples of which are shown in the various figures of the drawings thereof, or in any other suitable manner, so as to divide up the total surface thereof into a great number of individually small surfaces. Thus the total surface of the shield or shields is or are divided into many connected surfaces of individually small area.

From Fig. 3 there have been omitted the other parts of the generator shown in Fig. 1, but it is to be understood that the other parts shown in Fig. 1 or their equivalents are provided. In Fig. 3A I have represented the same construction as in Fig. 3, excepting that I have shown two concentric shields 13 and 13ᵃ between the terminal and the tank. The inner shield 13 is composed of the rings 14, as in Fig. 3, and the outer shield 13ᵃ is composed of similar rings 14ᵃ.

Figure 4:
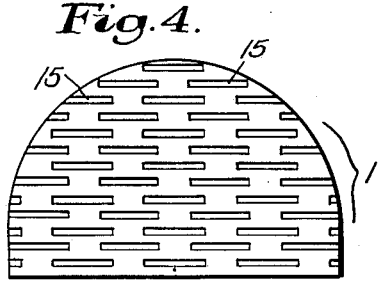
Fig. 4 is a side elevation of the second referred to form or embodiment of the main high-potential electrode or terminal constructed in accordance with my invention.
Figure 5:
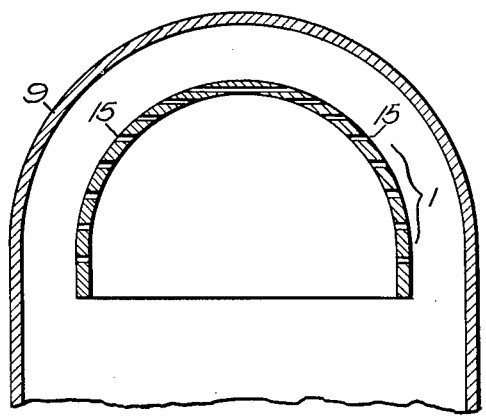
Fig. 5 is a view in vertical transverse section of the construction shown in Fig. 4 and representing in section a portion of the surrounding tank.

In Figs. 4 and 5, I have represented in side elevation and in transverse section the said second embodiment of the invention. It is to be understood, however, that there are many alternative constructions (not herein shown) which would accomplish the results secured by my invention, and which would employ the same principle of dividing the large electrically charged surface constituted by the terminal or by the shield or shields, or both, into a plurality of small surfaces connected to each other by paths of high transient impedance, and thus are within the scope of my invention.

Thus, in Figs. 4 and 5 there is represented the conventional metallic sheet construction for the electrode or terminal 1 which is then slotted by me throughout, as indicated at 15 in said figures, so as to cause surface currents to take a devious route in order to reach the discharge point. The said slots are indicated as horizontal, but they may be vertical or inclined or of any suitable shape and size, being desirably closely spaced, and they should have smooth rounded edges. In the event that a shield or shields be employed, with the construction shown in Figs. 4 and 5, such shield or shields is similarly slotted for the same purpose.

It is to be understood, however, that with any of the illustrated embodiments of the invention the dome-shaped electrode or terminal 1 may be of any of the constructions herein provided, and the shield or shields, if employed, may be of any of the disclosed constructions of the electrode or terminal 1, it, however, not being necessary, if a shield or shields be employed, that the surface of the shield or shields be divided into a plurality of small surfaces in the same manner that is employed in dividing into a plurality of small surfaces the surface of the electrode or terminal used in the same electrostatic generator, since the various forms or constructions of the electrode or terminal and of the shield or shields are or may be interchangeable.

In the construction shown in Fig. 6, which is a variation of the embodiment represented in Figs. 1, 2 and 3, the electrode or terminal 1 may be built by winding a solid continuous rod 16 into a close-spaced single-layer helix, the spires or turns of which are connected as indicated diagrammatically at 17, constituting or providing a high impedence. From ordinary consideration, the envelope constituted by such a helix as that indicated in Fig. 6 would be at the same potential for steady-state condition, but a high potential difference between the turns or spires of the rod 16 would develop in the event of a discharge because of the inductance of such construction. It is to be understood that in the construction shown in Fig 6, the rod 16 is continuous throughout, and that the turns or spires thereof are connected together at 17 as in Fig. 1, and that in order not to confuse the lines of Fig. 6, the portions of the rod 16 at the side or part of the electrode or terminal away from the observer are not shown.

In accordance with the third referred to embodiment of my invention which is illustrated in transverse section in Fig. 7, the high voltage terminal (and, if desired, the surrounding shield) is composed of high resistance material 17ª in place of metal. The material that I employ for this purpose is one capable of withstanding the effects of sparkover and also the transient flow of current when it occurs. My invention is not limited to any particular metallic substance for the purpose, such substance being equivalent in function to the introduction of impedances between one section of the terminal and another as disclosed in other embodiments of my invention herein.

Fig. 7 represents in vertical transverse section the high voltage terminal formed of high resistance material, in place of metal. Such a construction of the terminal (and, if desired, of the shield or shields outside thereof, if employed) is within the broad principle of my invention, namely, so forming the surface of the high voltage terminal that there exists a high impedance to the flow of charge from one region of the surface thereof to another.

In said Fig. 7, the terminal is represented at 17ª, by the two curved lines with dots therebetween, which showing is intended to indicate a semi-conductor, which may, for example, be carbon-impregnated rubber, or iron-oxide impregnated porcelain or other suitable non-metallic material.

In Fig. 8, I have somewhat diagrammatically indicated an electrode or terminal 1 constructed of rings 2, as described in connection with Fig. 1, and the tank 9, and I have diagrammatically indicated voltage at V and also the upper end of the supporting column.

In Fig. 9 I have represented a circuit to indicate the electrostatic action in the event of a discharge of stored energy released through sparkover. Therein C indicates the capacitance of the terminal to ground, and V indicates the potential of the terminal above ground. The symbol CV²/2 indicates the stored energy of the terminal.

In Fig. 10 the tank is indicated at 9, but instead of providing rings 2 or rods or slots as described in other forms or embodiments of my invention, the said electrode or terminal 1 is composed of a suitable plurality of sections, such as 18, 18ª, 18ᵇ, or more, each of which may be of uninterrupted sheet construction, as in the said Patent No. 2,252,668, and wherein the next adjacent ones of the sections 18, 18ª, 18ᵇ, etc. are connected by resistance 19 and by impedance 20, either or both of which may be employed to connect each two adjacent sections. In such construction the discharge path of stored energy released by flashover would be as disclosed in the diagram Fig. 11, wherein resistance is indicated at 22 and impedance at 23.

The herein disclosed manner of delaying the development of transients along the surface of the electrode or terminal 1 is, in accordance with my invention, employed also in the supporting column of the generator for the same purpose of delaying the development of transients along the supporting column.

Referring more particularly to Fig. 12, the electrode or terminal 1 is shown as composed of the connected rings 2, but any of the other constructions herein illustrated for the electrode or terminal, or their equivalents, may be employed. The supporting column is or may be of the same construction indicated in Fig. 1 (and such parts thereof need not be described in detail), but the entire column is divided into sections, the next adjacent sections thereof being connected together through a high impedance, several forms of which are schematically indicated at the right-hand side of Fig. 12, and are also illustrated in Fig. 11, which is intended diagrammatically to indicate the employment in a circuit of a set of small condensers in parallel, said condensers being connected together through high impedance as far as short-time transients, such as sparkover, are concerned.

I have herein indicated in Fig. 12 four sections 21, 21ª, 21ᵇ, 21ᶜ, constituting the supporting column, but it is to be understood that the number of sections depends upon the height of the supporting column, and that a very considerably larger number of sections than illustrated may well be employed, in which case the supporting column would be correspondingly longer; or as few as two sections may be used, constituting a short column.

The adjacent ends of each two next adjacent sections are spaced one from another and are insulated for a high voltage. Substantially no voltage difference exists between such two next adjacent ends of these sections, however, under normal steady-state operation, since they are electrically connected together by a conductive connection, diagrammatically indicated in Figs. 11 and 12. This connection is desirably in the form of one or more turns of wire or in any other shape that would offer high impedance to the high-frequency components of a transient current. In Fig. 12, at the right thereof, I have first represented a resistance 22. As an alternative construction I have at 23 represented an inductance, and at the extreme right I have represented both a resistance 22 and an inductance 23.

In Fig. 11, wherein a circuit is represented, providing high impedance as far as short-time transients, such as sparkover, is concerned, and wherein also small condensers in parallel are provided, I have represented both a resistance at 22 and also an inductance at 23 between each two next adjacent sections. The construction is such that if a transient disturbance attempts to propagate from one section into the next adjacent section, it encounters the disclosed high impedance barrier which both reduces the magnitude of the disturbance that is propagated and delays the propagation of this disturbance into the next adjacent section. It is desirable, in order to secure the stated effect, that the capacitance between two next adjacent ends of the sections be well insulated from one another excepting for the described connection, and that the inductive connection have a minimum or mutual capacity, and that the connection also have considerable ohmic resistance, as hereinbefore referred to.

These elements 20 and 23 constitute an inductive network and the elements 19 and 22 constitute a dissipative network, by which latter term is also meant a resistance network. These elements 19, 20, 22, 23, are all used for the purpose of reducing the destructive effect of an unwanted electrical discharge within a pressure-insulated electrostatic generator which has a high-voltage terminal, an insulating column for the terminal and a movable charge-conveyor for conveying charges between the said terminal and ground, that is to say, they are in each instance in series with the path of such discharge, so as to reduce the peak value of the current in the discharge and to increase its duration in time by a substantial amount.

Referring particularly to Fig. 11, in the conventional terminal of a high-voltage electrostatic generator, the circuit thereof is a simple condenser representing its capacitance to ground. The circuit of the corresponding terminal, in accordance with my invention, is a parallel set of smaller condensers indicated at 24, the sum of which is the same as before, but which are connected together through high impedance as far as short-time transients such as sparkover is concerned.

In the partially diagrammatic Fig. 12, the said condensers are also shown at 24.

Having thus described several embodiments of the apparatus by which the invention may be practiced, it is to be understood that although specific terms are employed, they are used in a generic and descriptive sense and not for purposes of limitation, the scope of the invention being set forth in the following claims.

I claim:

1. Means for inhibiting or reducing the effect of unwanted sparkover discharges from a high-voltage terminal in an apparatus for generating and building up high-voltage, electrostatic, direct-current potentials, comprising within a tank a high-voltage terminal of such apparatus, said high-voltage terminal having therein high impedance opposing the flow of charge from one region of the said high-voltage terminal to another region thereof, thereby reducing the capacitance that can be discharged from said terminal in the process of generating such high voltage in a given interval of time, and also thereby spreading out the discharge over a longer period of time, and also thereby reducing the peak of the discharged current.

2. In an electrostatic apparatus for the purpose of reducing the effect of sparkover, a high voltage terminal of general dome-shape and of relatively large surface area, the said surface of said terminal having a high-impedance structural formation incorporated therein, that divides the said surface into a plurality of different regions, thereby presenting a high impedance to the flow of charge from one region of said surface to another region of said surface, thereby reducing the peak value of the discharge current and spreading the discharge over a longer period of time.

3. In an electrostatic apparatus, for the purpose of reducing the effect of sparkover, a high voltage terminal of general dome-shape and of relatively large surface area, the said surface being divided into a multiplicity of surfaces of individually small area and physically attached together.

4. In an electrostatic apparatus, for the purpose of reducing the effect of sparkover, a high voltage terminal of general dome-shape and of relatively large surface area, the said high voltage terminal being composed of a plurality of closely spaced rings physically attached together to constitute a single electrode.

5. In an electrostatic apparatus, for the purpose of reducing the effect of sparkover, a high voltage terminal of general dome-shape and of relatively large surface area, the said high voltage terminal being composed of a plurality of closely spaced rings physically attached together to constitute a single electrode, the connections between the said rings having high resistance.

6. In an electrostatic apparatus, for the purpose of reducing the effect of sparkover, a high voltage terminal of general dome-shape and of relatively large surface area, the said high voltage terminal being composed of a plurality of closely spaced rings physically attached together to constitute a single electrode, the connections between said rings having inductance.

7. In an electrostatic apparatus, for the purpose of reducing the effect of sparkover, a high voltage terminal of general dome-shape and of relatively large surface area, the said high voltage terminal being composed of a plurality of closely spaced rings physically attached together to constitute a single electrode, the connections between the said rings having both high resistance and inductance.

8. In an electrostatic apparatus, for the purpose of reducing the effect of sparkover, a high voltage terminal of general dome-shape and of relatively large surface area, the said surface being divided into a multiplicity of surfaces of individually small area and physically attached together, a shield concentric with the said terminal and of approximately the same shape, the surface of the said shield being divided into a multiplicity of surfaces of individually small area and physically attached together.

9. In an electrostatic apparatus, a high voltage terminal having a relatively large surface adapted to be electrically charged, and at least one shield outside of and concentric with said terminal and of approximately the same shape, at least one of the said parts being constructed as a metallic sheet slotted at a multiplicity of areas so as to cause surface currents to take a devious route in order to reach the discharge point.

10. In an electrostatic apparatus, a high voltage terminal having a relatively large surface adapted to be electrically charged, and at least one shield outside of and concentric with said terminal and of approximately the same shape, at least one of the said parts being composed of a rod wound into a close-spaced single-layer helix.

11. In an electrostatic apparatus for the purpose of reducing the effect of sparkover, a high voltage terminal of general dome-shape and of relatively large surface area, the said surface being composed of high-resistance material, to create a high impedance to the flow of charge from one region of the said surface to another region thereof.

12. An electrostatic apparatus comprising a stationary, high voltage terminal, a movable charge conveyor for conveying charges between the terminal and ground, a tank enclosing said apparatus, at least one stationary shield intermediate the said terminal and the tank, said apparatus, for the purpose of reducing the effect of discharges from said terminal and from said shield or shields, having at least one of said stationary parts within the tank divided into a plurality of sections with high impedance and dissipative connections between each of such sections.

13. An electrostatic apparatus comprising a stationary, high voltage terminal, a movable charge conveyor for conveying charges between the terminal and ground, a tank enclosing said apparatus, and a plurality of stationary spaced shields intermediate the terminal and the tank, said apparatus, for the purpose of reducing the effect of unwanted discharges from the terminal or from the said shields, having at least one of said stationary parts within the tank divided into a plurality of sections with high impedance and dissipative connections between each of said sections.

14. An electrostatic apparatus comprising a stationary high voltage terminal, a movable charge conveyor for conveying charges between the terminal and ground, a tank enclosing said apparatus, at least one stationary shield intermediate the said terminal and the tank, said apparatus, for the purpose of reducing the effect of discharges from said terminal and from said shield or shields, having at least one of said stationary parts within the tank composed of high resistance material, to create a high impedance to the flow of charge from one region of the surface of one of said parts to another region of said part.

15. An electrostatic apparatus comprising a high voltage terminal, a movable charge conveyor for conveying charges between the terminal and ground, a tank enclosing said apparatus, and a plurality of spaced shields intermediate the terminal and the tank, said apparatus, for the purpose of reducing the effect of unwanted discharges from the terminal or from the said shields, having the said shields and also the said terminal each divided into a plurality of sections, with high impedance and dissipative connections between each of such sections.

16. A pressure-insulated electrostatic generator comprising a stationary high voltage terminal, a stationary insulating supporting column for said terminal, a movable charge conveyor for conveying charges between the terminal and ground, a tank surrounding said parts, and means for reducing the destructive effect of an unwanted electrical discharge in at least one of said two stationary parts within the said generator, comprising an inductive network which is in series with the path of such unwanted discharge, thereby functioning to reduce the peak value of the current in the discharge and to increase its duration in time by a substantial amount.

17. A pressure-insulated electrostatic generator comprising a stationary high voltage terminal, a stationary insulating supporting column for said terminal, a movable charge conveyor for conveying charge between the terminal and ground, a tank surrounding said parts, and means for reducing the destructive effect of an unwanted electrical discharge in at least one of said two stationary parts within the said generator, comprising a dissipative network which is in series with the path of such unwanted discharge, thereby functioning to reduce the peak value of the current in the discharge and to increase its duration in time by a substantial amount.

18. A pressure-insulated electrostatic generator comprising a stationary high voltage terminal, a stationary insulating supporting column for said terminal, a movable charge conveyor for conveying charges between the terminal and ground, a tank surrounding said parts, and means for reducing the destructive effect of an unwanted electrical discharge in at least one of said two stationary parts within the said generator, comprising an inductive and a dissipative network which is in series with the path of such unwanted discharge, thereby functioning to reduce the peak value of the current in the discharge and to increase its duration in time by a substantial amount.

19. An electrical apparatus comprising a high-voltage stationary terminal, a movable charge conveyor for conveying charges between the terminal and ground, a stationary insulating supporting column for said terminal, and a tank enclosing said parts, one at least of said stationary parts within the tank being divided into a plurality of lengthwise spaced sections, and means for reducing the destructive effect of an unwanted electrical discharge occurring in either one of said stationary parts, which means comprises an inductive network between said spaced sections of at least one of said stationary parts and which network is in the path of such discharge when occurring in at least one of said stationary parts, thereby reducing the peak value of the current in the discharge and increasing its duration in time by a substantial amount.

20. An electrical apparatus comprising a high-voltage stationary terminal, a movable charge conveyor for conveying charges between the terminal and ground, a stationary insulating supporting column for said terminal, and a tank enclosing said parts, one at least of said stationary parts within the tank being divided into a plurality of lengthwise spaced sections, and means for reducing the destructive effect of an unwanted electrical discharge occurring in either one of said stationary parts, which means comprises a dissipative network between said spaced sections of at least one of said stationary parts and which network is in the path of such discharge when occurring in at least one of said stationary parts, thereby reducing the peak value of the current in the discharge and increasing its duration in time by a substantial amount.

21. An electrical apparatus comprising a high-voltage stationary terminal, a movable charge conveyor for conveying charges between the terminal and ground, a stationary insulating supporting column for said terminal, and a tank enclosing said parts, one at least of said stationary parts within the tank being divided into a plurality of lengthwise spaced sections, and means for reducing the destructive effect of an unwanted electrical discharge occurring in either one of said stationary parts, which means comprises an inductive and a dissipative network between said spaced sections of at least one of said stationary parts and which network is in the path of such discharge when occurring in at least one of said stationary parts, thereby reducing the peak value of the current in the discharge and increasing its duration in time by a substantial amount.

22. An electrostatic, high-voltage, belt-generator apparatus or system having means for reducing destructive transients therein, comprising a stationary high-voltage terminal, a movable charge conveyor for conveying charges between the terminal and ground, and thereby building up electrostatic charges of one sign upon the terminal, and removing charges of the opposite sign from said terminal, a stationary, insulating supporting column for such terminal, a tank enclosing said parts, one at least of said stationary parts within the tank being divided into a plurality of lengthwise spaced sections connected by high impedance network for the purpose of inhibiting or reducing the effect of unwanted sparkover discharge from one at least of said stationary parts within the tank, such impedance networks between lengthwise spaced sections of at least one of said stationary parts within the tank acting to reduce the capacitance that can be discharged in the process of generating the high voltage of the apparatus or system in a given interval of time, and also acting to spread out the discharge of unwanted sparkover from at least one of such stationary parts within the tank over a longer period of time, and thereby reducing the peak of the discharged current.

23. An electrostatic, high-voltage, belt-generator apparatus or system having means for reducing destructive transients therein, comprising a stationary high-voltage terminal, a movable charge conveyor for conveying charges between the terminal and ground, thereby building up electrostatic charges of one sign upon the terminal, and removing charges of the opposite sign from said terminal, a stationary, insulating, supporting column for such terminal, a tank enclosing said parts, said terminal being divided into a plurality of spaced sections connected by high impedance network for the purpose of inhibiting or reducing the effect of unwanted sparkover discharge from said terminal, such impedance network between sections of said terminal acting to reduce the capacitance that can be discharged in the process of generating the high voltage of the apparatus in a given interval of time and also acting to spread out the discharge of unwanted sparkover from such terminal over a longer period of time, and thereby reducing the peak of the discharged current.

24. In an electrostatic apparatus, a high-voltage terminal having a relatively large surface adapted to be electrically charged, said high-voltage terminal being composed of a rod wound into a close-spaced single-layer helix, the spires thereof being physically connected by means providing high impedance therebetween, a movable charge carrier for conveying charges between the said terminal and ground, and a tank enclosing said terminal and charge conveyor.

25. An electrostatic apparatus comprising a high voltage terminal, a movable charge conveyor for conveying charges between the terminal and ground, a tank enclosing said apparatus, and a supporting column for the said high voltage terminal, said column being constructed of alternate layers of insulating and conducting materials and an inductive network connected between adjacent conducting layers at a plurality of spaced points along the column so as to introduce a high impedance to the flow of transient currents.

26. An electrostatic apparatus comprising a high voltage terminal, a movable charge conveyor for conveying charges between the terminal and ground, a tank enclosing said apparatus, and a supporting column for the said high voltage terminal, said column being constructed of alternate layers of insulating and conducting materials, said column being divided into a plurality of superimposed sections, the adjacent ends of each two next adjacent sections being spaced from each other but connected together by a conductive connection presenting high impedance to the high frequency component of a transient current.

27. An electrostatic apparatus comprising a high voltage terminal, a movable charge conveyor for conveying charges between the terminal and ground, a tank enclosing said apparatus, and a supporting column for the said high voltage terminal, said column being constructed of alternate layers of insulating and conducting materials and an inductive and a dissipative network connected between adjacent conducting layers at a plurality of spaced points along the column so as to introduce a high impedance to the flow of transient currents.

28. An electrostatic apparatus comprising a high voltage terminal, a movable charge conveyor for conveying charges between the terminal and ground, a tank enclosing said apparatus, and a supporting column for the said high voltage terminal, said column being constructed of alternate layers of insulating and conducting material, said column being divided into sections, the adjacent ends of each two sections being spaced from each other and insulated for a high voltage.

29. An electrostatic apparatus comprising a high voltage terminal, a movable charge conveyor for conveying charges between the terminal and ground, a tank enclosing said apparatus, and a supporting column for the said high voltage terminal, said column being constructed of alternate layers of insulating and conducting material, said column being divided into sections spaced one from another but electrically connected together by an inductive connection offering high impedance to the high frequency components of a transient current, thereby reducing the magnitude of the propagated disturbance and delaying the propagation of such disturbance into the adjacent section of the supporting column.

30. An electrostatic apparatus comprising a high voltage terminal, a movable charge conveyor for conveying charges between the terminal and ground, a tank enclosing said apparatus, and a supporting column for the said high voltage terminal, said column being constructed of alternate layers of insulating and conducting material, said column being divided into sections spaced one from another but electrically connected together by an inductive connection offering high impedance to the high frequency components of a transient current, thereby reducing the magnitude of the propagated disturbance and delaying the propagation of such disturbance into the adjacent section of the supporting columns, the adjacent ends of the sections being insulated one from the other and constituting a capacitance across which the inductive and dissipative network is connected.

31. An electrostatic apparatus comprising a high voltage terminal, a movable charge conveyor for conveying charges between the terminal and ground, a tank enclosing said apparatus, and a supporting column for the said high voltage terminal, said column being constructed of alternate layers of insulating and conducting material, said column being divided into sections, the adjacent ends whereof are separated and insulated from each other except for a connection between them comprising a high impedance network having both an inductive and a dissipative component.

32. An electrostatic apparatus comprising a high voltage terminal, a movable charge conveyor for conveying charges between the terminal and ground, a tank enclosing said apparatus, and a supporting column for the said high voltage terminal, said column being constructed of alternate layers of insulating and conducting material, said column being divided into sections, each section consisting of spaced and mutually insulated equipotential plane-elements, the abutting ends of the adjacent sections being separated by insulation and connected by an impedance which prevents any difference of potential between them under normal steady-state operating conditions, but which causes the development of a large difference of potential in the event of a transient discharge lengthwise the said supporting column, such difference of potential serving in the operation of the apparatus to absorb the energy of such a discharge and to reduce both its magnitude and speed.

33. Means for inhibiting or of reducing the effect of unwanted sparkover discharges from the high voltage terminal or from the equipotential shields of pressure-insulated electrostatic generators or from both, comprising a supporting column for the terminal divided into a plurality of sections, the adjacent ends whereof are axially spaced from each other, and are axially insulated from each other except for a connection between them comprising a high-impedance network having both an inductive and a dissipative component which is without effect in the normal operation of the generator, but which introduces a high impedance to an electrical discharge lengthwise the column.

34. Means for inhibiting or reducing the destructive effect along and within the supporting column of an electrostatic generator having a high voltage terminal and a movable charge conveyor for conveying charges between the terminal and ground, comprising a supporting column divided into a plurality of sections, the adjacent ends whereof are axially spaced from each other, and are axially insulated from each other except for a connection between them which constitutes a high impedance network having both an inductive and a dissipative component which is without effect in the normal operation of the generator, but which introduces a high impedance to an electrical discharge lengthwise the column.

35. Means for inhibiting or reducing the destructive effect along and within the supporting column of an electrostatic generator having a high voltage terminal and a movable charge conveyor for conveying charges between the terminal and ground, comprising a supporting column divided into a plurality of sections, each of which consists of spaced and mutually insulated equipotential plane elements, the adjacent ends of the next adjacent sections of which the column is composed being axially spaced from each other and separated by insulation and connected by an impedance which prevents any difference of potential between them under normal steady-state operating conditions, but which causes the development of a large difference of potential in the event of a transient discharge lengthwise such column, and which potential serves to absorb the energy of such a discharge and to reduce its magnitude and increase its duration.

JOHN G. TRUMP.

REFERENCES CITED

The following references are of record in the file of this patent:

UNITED STATES PATENTS

| Number | Name | Date |
|---|---|---|
| 911,260 | Pennock | Feb. 2, 1909 |
| 1,991,236 | Van de Graaff | Feb. 12, 1935 |
| 2,005,451 | Browne | June 18, 1935 |
| 2,252,668 | Trump | Aug. 12, 1941 |

FOREIGN PATENTS

| Number | Country | Date |
|---|---|---|
| 800,004 | France | Apr. 20, 1936 |